United States Patent
Abe et al.

(10) Patent No.: US 9,687,817 B2
(45) Date of Patent: Jun. 27, 2017

(54) CARRIER FOR EXHAUST GAS PURIFICATION CATALYST, AND EXHAUST GAS PURIFICATION CATALYST

(71) Applicant: Mitsui Mining & Smelting Co., Ltd., Tokyo (JP)

(72) Inventors: Akira Abe, Saitama (JP); Takahiro Sato, Saitama (JP); Ohki Houshito, Saitama (JP); Yuki Nagao, Saitama (JP); Yunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/032,937

(22) PCT Filed: Oct. 17, 2014

(86) PCT No.: PCT/JP2014/077660
§ 371 (c)(1),
(2) Date: Apr. 28, 2016

(87) PCT Pub. No.: WO2015/064385
PCT Pub. Date: May 7, 2015

(65) Prior Publication Data
US 2016/0279606 A1    Sep. 29, 2016

(30) Foreign Application Priority Data
Oct. 31, 2013   (JP) .................................. 2013-226873

(51) Int. Cl.
*B01J 21/04*     (2006.01)
*B01J 23/44*     (2006.01)
(Continued)

(52) U.S. Cl.
CPC .......... *B01J 21/04* (2013.01); *B01D 53/9445* (2013.01); *B01J 21/02* (2013.01); *B01J 23/44* (2013.01);
(Continued)

(58) Field of Classification Search
CPC ... B01J 21/02; B01J 21/04; B01J 23/44; B01J 35/0006; B01J 35/1061; B01J 35/1066; B01J 35/1071
(Continued)

(56) References Cited

U.S. PATENT DOCUMENTS 2,118,143 A * 5/1938 Benner .................. C04B 33/13
                                                423/279
3,998,930 A * 12/1976 McArthur ............ B01D 53/945
                                                423/213.5
(Continued)

FOREIGN PATENT DOCUMENTS

| JP | 06099069 | 4/1994 |
| JP | 06134312 | 5/1994 |

(Continued)

OTHER PUBLICATIONS

International Search Report dated Dec. 2, 2014 filed in PCT/JP2014/077660.
(Continued)

*Primary Examiner* — Patricia L Hailey
(74) *Attorney, Agent, or Firm* — Rankin, Hill & Clark LLP

(57) ABSTRACT

Provided is a carrier for an exhaust gas purification catalyst containing aluminum borate particles having a peak (pore peak) exhibiting the highest intensity in a void volume diameter range of from 20 nm to 100 nm in a logarithmic differential void volume distribution measured using a mercury intrusion porosimeter, in order to provide a new catalyst (Continued)

support capable of effectively suppressing a decrease in catalytic performance caused by sulfur (S) component contained in the exhaust gas, in the case of supporting Pd as a catalytically active component.

9 Claims, 1 Drawing Sheet

(51) Int. Cl.
    *B01J 23/63*     (2006.01)
    *B01D 53/94*     (2006.01)
    *B01J 21/02*     (2006.01)
    *B01J 35/00*     (2006.01)
    *B01J 35/10*     (2006.01)

(52) U.S. Cl.
    CPC ........... *B01J 23/63* (2013.01); *B01J 35/0006* (2013.01); *B01J 35/1061* (2013.01); *B01J 35/1066* (2013.01); *B01D 2255/1023* (2013.01); *B01D 2255/2092* (2013.01); *B01D 2255/9205* (2013.01); *Y02T 10/22* (2013.01)

(58) Field of Classification Search
    USPC ........................................ 502/202, 207, 303
    See application file for complete search history.

(56) References Cited

U.S. PATENT DOCUMENTS

| | | | |
|---|---|---|---|
| 6,174,432 B1 | 1/2001 | Yamamoto | |
| 2013/0116115 A1* | 5/2013 | Sato | B01D 53/945 502/207 |
| 2014/0243191 A1* | 8/2014 | Sato | B01D 53/945 502/207 |
| 2016/0082419 A1* | 3/2016 | Nakahara | F01N 3/106 502/207 |
| 2016/0082420 A1* | 3/2016 | Nagao | B01J 35/0006 423/213.2 |

FOREIGN PATENT DOCUMENTS

| | | | | |
|---|---|---|---|---|
| JP | 07171392 | | 7/1995 | |
| JP | 08281071 | | 10/1996 | |
| JP | 10230163 A2 | | 9/1998 | |
| JP | 11309372 A2 | | 11/1999 | |
| JP | 2001316679 A2 | | 11/2001 | |
| JP | 2002370035 A2 | | 12/2002 | |
| JP | 201216685 | | 1/2012 | |
| JP | 2013075286 A2 | | 4/2013 | |
| WO | 2012/005375 | * | 1/2012 | .............. F01N 3/10 |
| WO | 2013/098987 | * | 7/2013 | .............. B01J 23/58 |
| WO | 2013098987 A1 | | 7/2013 | |
| WO | 2015/064385 | * | 5/2015 | .............. B01J 35/10 |

OTHER PUBLICATIONS

Martin et al. "Crystal-chemistry of mullite-type aluminoborates Al18B4O33 and Al5BO9:A stoichiometry puzzle", Journal of Solid State Chemistry 184(2011)70-80.

Kazuma Watanabe et al., "Kikinzoku Shiyoryo no Taigen o Mezashita Shinki Fukugo Sankabutsu Tantai no Kaihatsu", Kagaku Kanren Shibu Godo Kyushu Taikai Gaikokujin Kenkyusha Koyru Kokusai Symposium Koen Yokoshu, Jul. 11, 2009, vol. 46, p. 71, and its English translation thereof.

Chinese Office Action dated Mar. 20, 2017 issued in the corresponding Chinese patent application No. 201480057582.5.

R.Abbas-Ghaleb et al., "Al18B4O33 aluminium borate: A new efficient support for palladium in the high temperature catalytic combustion of methane," Catalysis Today, vol. 117, Issue 4, Oct. 15, 2006, pp. 514-517.; English abstract only.; Cited in CNOA.

M.S.Rana et al., "Hydrotreating of Maya Crude Oil: I. Effect of Support Composition and Its Pore-diameter on Asphaltene Conversion," Petroleum Science and Technology, vol. 25, 2007, pp. 187-199.; English abstract only.; Cited in CNOA.

* cited by examiner

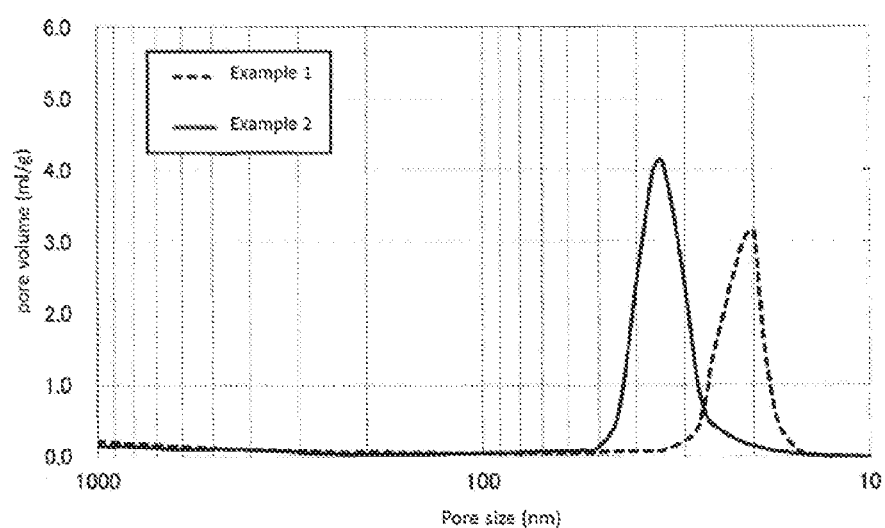

CARRIER FOR EXHAUST GAS PURIFICATION CATALYST, AND EXHAUST GAS PURIFICATION CATALYST

TECHNICAL FIELD

The present invention relates to an exhaust gas purification catalyst which can be used for purifying exhaust gas discharged from an internal combustion engine of a two-wheel or four-wheel motor vehicle or the like, and a carrier for an exhaust gas purification catalyst used therein.

BACKGROUND ART

The exhaust gas of an internal combustion engine of a motor vehicle or the like which uses gasoline as the fuel contains hazardous components such as hydrocarbons (THC), carbon monoxide (CO), and nitrogen oxides (NOx), and thus each of these hazardous components is required to be purified through redox reaction at the same time and then exhausted.

For example, it is required to convert the hydrocarbons (THC) into water and carbon dioxide through oxidation, to convert carbon monoxide (CO) into carbon dioxide through oxidation, and to convert the nitrogen oxides (NOx) into nitrogen through reduction for the purification thereof.

As a catalyst for treating such an exhaust gas from an internal combustion engine (hereinafter, referred to as the "exhaust gas purification catalyst"), a three way catalyst (TWC) capable of performing redox of CO, THC, and NOx is used.

As this kind of three way catalyst, those which are obtained by combining a precious metal, such as Pt, Pd, or Rh, with alumina, ceria, zirconia, or a composite oxide thereof and then coating the combined one on a honeycomb substrate, such as a ceramic or a metal, are known. In recent years, a catalyst for exhaust gas purification using relatively inexpensive Pd as a catalytically active component has been developed as the price of Pt or Rh of a precious metal has increased (for example, see Patent Documents 1, 2, and 3).

It is difficult to support a sufficient amount of a precious metal in a highly dispersed manner even though it is attempted to support a precious metal directly on a honeycomb substrate since the chemical bond strength between the precious metal as the catalytically active component and the honeycomb substrate is not so strong and the specific surface area of the honeycomb substrate itself is also not so large. Hence, it is performed that a precious metal is supported on a particulate catalyst support having a large specific surface area in order to support a sufficient amount of the catalytically active component on the surface of a honeycomb substrate in a highly dispersed manner.

As this kind of carrier for an exhaust gas purification catalyst (also referred to as the "catalyst support" or "support"), for example, porous particles composed of a refractory inorganic oxide such as silica, alumina, or titania compound is known.

Recently, a technique of using aluminum borate as a catalyst support is disclosed. For example, a technique is disclosed in Patent Document 4, in which it is attempted to improve the gas diffusibility by supporting a catalytic component on the green compact containing a powder body consisting of which the outside is covered with aluminum borate whiskers and a hollow portion is formed in the inside.

However, aluminum borate whiskers described above have a needle shape and thus the whiskers have a small specific surface area and a problem of durability that the aggregation of the precious metal after endurance is not avoidable.

Hence, the invention described in Patent Document 5 (JP 2012-16685 A) proposes a catalyst for exhaust gas purification containing a support which contains aluminum borate, is represented by Formula $9Al_2O_3 \cdot 2B_2O_3$, and is modified with $La_2O_3$ in an amount to be from 0.3 to 2% by mass based on the mass of aluminum borate and Pd supported on the support as a catalyst for exhaust gas purification which exhibits excellent exhaust gas purifying performance after endurance at a high temperature and excellent degree of dispersion of a precious metal, particularly, Pd.

In addition, as the catalyst having large oxygen-containing storage capacity and the excellent ability of purification of exhaust gas, particularly for purifying the NOx under fuel-rich region, after high-temperature endurance, the invention described in Patent Document 6 (JP 2013-075286 A) proposes a catalyst support containing aluminum borate obtained by substituting from 2.5 to 11.5 at % of the aluminum atoms in the aluminum borate with Fe, Co, Ga, or Ni, and an exhaust gas catalyst containing Pd supported on the catalyst support described above, and a catalyst composite consisting of ceramic or metallic substrate and the catalyst layer for exhaust gas purification supported on the substrate.

CITATION LIST

Patent Document

Patent Document 1: JP 06-099069 A
Patent Document 2: JP 07-171392 A
Patent Document 3: JP 08-281071 A
Patent Document 4: JP 2002-370035 A
Patent Document 5: JP 2012-16685 A
Patent Document 6: JP 2013-075286 A

SUMMARY OF THE INVENTION

Problem to be Solved by the Invention

It is known that the catalytic performance of catalytically active components, particularly Pd, is likely to be decreased by the sulfur (S) component contained in the exhaust gas. For this reason, it is a major challenge to improve the sulfur tolerance of catalytically active components, particularly Pd among them, on developing an exhaust gas purification catalyst.

The invention focuses on a technique of using aluminum borate as a catalyst support. Furthermore, in the situation that a catalyst support supports a precious metal, particularly Pd, as a catalytically active component, the invention aim to provide a new catalyst support and a exhaust gas purification catalyst using the same that are effectively able to suppress a decrease in catalytic performance of a precious metal caused by a sulfur (S) component contained in the exhaust gas.

Means for Solving Problem

The invention proposes a carrier for an exhaust gas purification catalyst which contains aluminum borate particles having a peak (also referred to as the "pore peak") exhibiting the highest intensity in a void volume diameter range of from 20 nm to 100 nm in the logarithmic differential void volume distribution measured using a mercury intrusion porosimeter.

Effect of the Invention

The carrier for an exhaust gas purification catalyst proposed by the invention has voids having a proper size and exhibits excellent sulfur tolerance. Thus it can effectively suppress a decrease in catalytic performance of the precious metal as a catalytically active component due to a sulfur (S) component contained in the exhaust gas, even if the carrier supports Pd as a catalytically active component. In addition, the carrier for an exhaust gas purification catalyst containing the aluminum borate particles has fewer surface hydroxyl groups and also has a stronger surface acidity as compared to the carrier for an exhaust gas purification catalyst composed of alumina, and thus it also has a feature to be strong against poisoning by an acidic substance such as a sulfur (S) component.

BRIEF DESCRIPTION OF DRAWINGS

The Figure is a pore distribution chart for the Pd-supporting aluminum borate powders obtained in Examples 1 and 2.

MODE(S) FOR CARRYING OUT THE INVENTION

Next, the invention will be described with reference to embodiments. However, the invention is not limited to the embodiments to be described below.

<Present Catalyst>

The exhaust gas purification catalyst (hereinafter, referred to as the "present catalyst") as an example of embodiments of the invention is a composition which contains a catalyst support (hereinafter, referred to as the "present catalyst support") and a catalytically active component to be supported on the catalyst support, and it can contain a promoter such as an OSC material, a stabilizer, and other components if necessary.

<Present Catalyst Support>

It is important that the present catalyst contains aluminum borate particles as the present catalyst support. However, the present catalyst support may be composed of only aluminum borate particles, and it may contain other support particles other than the aluminum borate particles as a catalyst support.

(Present Aluminum Borate Particles)

It is important that the aluminum borate particles (referred to as the "present aluminum borate particles") contained in the present catalyst has a peak (also referred to as the "pore peak") exhibiting the highest intensity in a void volume diameter range of from 20 nm to 100 nm in the logarithmic differential void volume distribution measured using a mercury intrusion porosimeter.

In other words, the logarithmic differential void volume distribution of the present aluminum borate particles may have one peak and the peak may be present in a void volume diameter range of from 20 nm to 100 nm, or it may have two or more peaks and the peak exhibiting the highest intensity, namely, the peak having the highest peak height among them may be present in a void volume diameter range of from 20 nm to 100 nm.

When the pore peak of the present aluminum borate particles is present in a void volume diameter range of smaller than 20 nm, the voids are likely to clog by the accumulation of the sulfur component and the active sites in the void are less likely to function, and thus the catalytic activity of the catalytically active component is likely to decrease. On the other hand, when the pore peak is present in a void volume diameter range of 20 nm or more, not only clogging of the void due to the accumulation of the sulfur component is less likely to occur but also the sulfur component is likely to be immediately eliminated even in the case of being adsorbed, and thus the present catalyst exhibits excellent sulfur tolerance. Hence, it is possible to effectively suppress a decrease in catalytic performance of the precious metal due to the sulfur (S) component contained in the exhaust gas even in the case of supporting a precious metal, particularly, Pd as a catalytically active component.

Meanwhile, it is considered to be the limit in production that the pore peak of present catalyst is at a void volume diameter of 100 nm.

From this point of view, it is important that the present aluminum borate particles have a pore peak in a void volume diameter range of from 20 nm to 100 nm in the logarithmic differential void volume distribution, and it is even more preferable to have a pore peak in a void volume diameter range of from 25 nm to 70 nm among them, a void volume diameter range of from 30 nm to 60 nm among them, and a void volume diameter range of from 30 nm to 50 nm among them.

In the present aluminum borate particles, it is even more preferable that a void having a void volume diameter of from 20 nm to 70 nm accounts for 50% or more of the voids having a void volume diameter of from 10 nm to 1000 nm, 70% or more among them, 80% or more among them, and 90% or more among them from the viewpoint of being able to obtain superior sulfur tolerance.

In addition, in the present aluminum borate particles, it is preferable that the mass ratio of the content of aluminum (Al) to the content of boron (B) (mass ratio of Al/B) is from 6 to 35.

It is preferable that the mass ratio of Al/B is 6 or more. If mass ratio of Al/B is in the range described above, therefore boron (B) is not excessively present, $B_2O_3$ having a low melting point is not generated, and thus the heat resistance of aluminum borate does not decrease. In addition, the dispersibility of the precious metal supported does not decrease by the influence of $B_2O_3$, and thus it is possible to maintain the exhaust gas purifying performance. Meanwhile, it is preferable that the mass ratio of Al/B is 35 or less. If mass ratio of Al/B is in the range described above, $Al_2O_3$ component is not excessively present. And thus the catalyst particles are hardly affected by the sulfur component as compared to a case in which the catalyst particles are composed of only $Al_2O_3$.

Among those described above, it is even more preferable that the mass ratio of Al/B in the present aluminum borate particles is in a range of from 9 to 16 from the viewpoint of achieving both the heat resistance and the sulfur tolerance, and it is even more preferably 9 or more or less than 12.5 among them.

At this time, the stoichiometric quantity of $10Al_2O_3 \cdot 2B_2O_3$ is Al/B=12.5, and thus the present aluminum borate particles are composed of a crystal structure represented by $10Al_2O_3 \cdot 2B_2O_3$ or $9Al_2O_3 \cdot 2B_2O_3$ constitutes the main component particles when the mass ratio of Al/B is in a range of from 9 to 16.

Incidentally, in "Crystal-chemistry of mullite-type aluminoborates $Al_{18}B_4O_{33}$ and $Al_5BO_9$: A stoichiometry puzzle" by Martin, et al., the Journal of Solid State Chemistry 184 (2011) 70-80, it is described that aluminum borate is represented by $Al_5BO_9$ ($5Al_2O_3:B_2O_3$, $Al_{20}B_4O_{36}$), namely, Formula $10Al_2O_3.2B_2O_3$, furthermore, both of Formulas $9Al_2O_3.2B_2O_3$ ($Al_{18}B_4O_{33}$) and $Al_5BO_9$ ($5Al_2O_3:B_2O_3$, $Al_{20}B_4O_{36}$) are acceptable with regard to aluminum borate, that is, both of them are the same substance.

Among them, $2Al_2O_3.B_2O_3$ is generated in addition to $10Al_2O_3.2B_2O_3$ or $9Al_2O_3.2B_2O_3$ in a case in which the mass ratio of Al/B is in a range of 9 or more and less than 12.5.

Hence, the present aluminum borate particles contain a mixture of a crystal structure represented by $10Al_2O_3.2B_2O_3$ or $9Al_2O_3.2B_2O_3$ and a crystal structure represented by $2Al_2O_3.B_2O_3$ as the main component particles. At this time, $2Al_2O_3.B_2O_3$ has the same effect as $10Al_2O_3.2B_2O_3$ or $9Al_2O_3.2B_2O_3$ and is acknowledged to have the same effect with regard to the sulfur tolerance.

Meanwhile, it is even more preferable that the mass ratio of Al/B is in a range of from 15 to 35 among the ranges described above when the intention is focused on the purifying performance of NOx.

When the mass ratio of Al/B is in a range of from 15 to 35, a crystal structure represented by $Al_2O_3$ is generated in addition to a crystal structure represented by $10Al_2O_3.2B_2O_3$ or $9Al_2O_3.2B_2O_3$, and a mixture of a crystal structure represented by $10Al_2O_3.2B_2O_3$ or $9Al_2O_3.2B_2O_3$ and a crystal structure represented by $Al_2O_3$ is obtained.

In addition, it is also preferable that the present aluminum borate particles contain modified aluminum borate containing at least one kind of oxide among the oxides of elements selected from the group consisting of Zr, Si, Fe, and Ti.

It is presumed that such modified aluminum borate is hardly attacked by sulfur contained in the exhaust gas since an acidic element is present on the surface thereof and the acidity of the surface thereof is stronger, and this makes it possible to prevent the supported platinum group element such as Pd from being inactivated.

Incidentally, it is possible to confirm which crystal structure the aluminum borate particles contain through analysis by the X-ray diffraction (XRD) method.

In addition, the crystal structure represented by $10Al_2O_3.B_2O_3$ or $9Al_2O_3.2B_2O_3$ described above includes a mixture of a crystal structure represented by $10Al_2O_3.2B_2O_3$ and a crystal structure represented by $9Al_2O_3.2B_2O_3$.

Furthermore, it is preferable that the present aluminum borate particles contain lanthanum (La).

The present aluminum borate particles can support La in a state of being uniformly dispersed, and thus it is possible to enhance the dispersibility of the precious metal at a high temperature. In addition, the sulfur component is likely to adsorb to La added in general alumina, but it is possible to suppress the easy adsorption of the sulfur component to the present aluminum borate particles due to excellent sulfur tolerance thereof. Hence, the present aluminum borate particles containing La exert both the sulfur tolerance by the present aluminum borate particles and the heat resistance by La addition, and thus it is possible to suppress the excessive generation of La aluminate to be generated at a high temperature and to suppress a decrease in catalytic activity, for example, even in the case of being exposed to a high temperature environment in which sulfur (S) coexists.

Incidentally, the present aluminum borate particles can support La in a state of being uniformly dispersed, and thus this state is also referred to as "being modified by La".

In a case in which the present aluminum borate particles contain lanthanum (La), the content of lanthanum (La) is preferably from 0.1 to 5 parts by mass in terms of metal with respect to 100 parts by mass of the present aluminum borate particles.

It is possible to improve the elimination characteristics of the sulfur component adsorbed at a low temperature and to suppress the accumulation of the sulfur component when La is contained in the present aluminum borate particles at about 0.1 part by mass. Meanwhile, when the La content is too great, the amount of sulfur component adsorbed to La increases too much, and a decrease in performance rather is led, but when the La content is 5 parts by mass or less, it does not occur that, completely covering the surface of aluminum borate with La inhibits the effect of eliminating the sulfur component by aluminum borate, and thus it is possible to maintain the purifying performance by suppressing the amount of the sulfur component adsorbed. In addition, it is possible to maintain the dispersibility of the precious metal at a high temperature. In this manner, the content of lanthanum (La) is preferably from 0.1 to 5.0 parts by mass in terms of metal with respect to 100 parts by mass of the present aluminum borate particles from the viewpoint of synergistically exerting the sulfur tolerance by the present aluminum borate particles and the heat resistance and sulfur eliminating properties by La addition, and it is even more preferably 0.2 part by mass or more or 3.5 parts by mass or less among them and particularly 0.5 part by mass or more or 2.0 parts by mass or less among them.

From the same viewpoint, the content of lanthanum (La) is preferably from 0.1 to 4.8% by mass in terms of metal with respect to the La-containing aluminum borate powder (=aluminum borate+La), and it is preferably 0.2% by mass or more or 3.4% by mass or less among them and 0.5% by mass or more or 2.0% by mass or less among them.

(Method for Producing Present Aluminum Borate Particles)

As the method for producing the present aluminum borate particles, for example, the present aluminum borate particles can be obtained by dissolving boric acid in water, introducing a boehmite (alumina hydrate, AlOOH) powder having a predetermined void volume diameter into this, stirring them together, and then heating, drying, and calcining the mixture at from 950 to 1200° C. for from 3 hours to 10 hours in an air atmosphere. It is possible to produce the present aluminum borate particles having a relatively large void volume diameter as described above by producing the present aluminum borate particles using a boehmite (alumina hydrate, AlOOH) powder having a predetermined void volume diameter. However, the producing method is not limited to this producing method.

At this time, it is preferable to use those which have a pore peak in a void volume diameter range of from 15 nm to 100 nm in the logarithmic differential void volume distribution measured using a mercury intrusion porosimeter as the boehmite (alumina hydrate, AlOOH) powder particles.

In addition, when containing lanthanum (La) in the present aluminum borate particles, the present aluminum borate particles modified by La can be obtained by mixing the present aluminum borate particles produced as described above with a solution of a lanthanum compound, and drying and then calcining the mixture at from 500 to 1000° C. for from 1 hour to 5 hours in an air atmosphere.

(Other Support Particles)

The present catalyst may contain other inorganic porous particles as a catalyst support in addition to the present aluminum borate particles.

Examples of other inorganic porous particles as a catalyst support may include porous particles of a compound selected from the group consisting of silica, alumina, and titania compounds, and more specific examples thereof may include porous particles composed of a compound selected from alumina, silica, silica-alumina, alumino-silicate, alumina-zirconia, alumina-chromia, or alumina-ceria.

<Catalytically Active Component>

Examples of the catalytically active component contained in the present catalyst, namely, a metal exhibiting catalytic activity may include a metal such as palladium, platinum, rhodium, gold, silver, ruthenium, iridium, nickel, cerium, cobalt, copper, iron, manganese, osmium, or strontium. Among them, it is even more preferable to contain palladium as the catalytically active component from the viewpoint of further exerting the effect of the present catalyst that a decrease in catalytic performance of the catalytically active component due to the sulfur (S) component contained in the exhaust gas can be effectively suppressed.

The amount of the catalytically active component supported in the present catalyst is preferably from 0.3 to 3% by mass based on the mass of the support in terms of the mass of active component, and it is even more preferably 0.4% by mass or more or 2% by mass among them.

From the same viewpoint, the amount of the catalytically active component supported is preferably from 0.3 to 2.9% by mass with respect to the present catalyst (=active component+support), and it is even more preferably 0.4% by mass or more or 2% by mass or less among them.

<Promoter>

The present catalyst may contain, for example, an OSC material, namely, a promoter (OSC material) exhibiting oxygen storage capacity (OSC) as a promotor.

Examples of such an OSC material may include a cerium compound, a zirconium compound, and a ceria-zirconia composite oxide.

<Stabilizer and Other Components>

The present catalyst can contain a stabilizer, a binder, and other components.

Examples of the stabilizer may include an alkaline earth metal or an alkali metal. Among them, it is possible to select one kind or two or more kinds among the metals selected from the group consisting of magnesium, barium, boron, thorium, hafnium, silicon, calcium, and strontium. Among them, barium is preferable from the viewpoint that the temperatures at which Pd oxide is reduced is the highest, that is, Pd oxide is less likely to be reduced.

In addition, the present catalyst may contain a known additive component such as a binder component.

As the binder component, it is possible to use an inorganic binder, for example, an aqueous solution such as alumina sol.

<Method for Producing Present Catalyst>

The present catalyst can be produced, for example, by mixing a solution of the present aluminum borate particles and a Pd compound with other components, and heating, drying, and then calcining the mixture.

Examples of the solution of a Pd compound may include palladium nitrate, palladium chloride, and palladium sulfate.

Examples of other components may include a promoter such as an OSC material, a stabilizer, and a binder.

Incidentally, in the case of adding a lanthanum compound, it is preferable to evaporate and dry the mixture at from 100 to 150° C. for about one night so that the lanthanum compound is uniformly attached onto the surface of aluminum borate and then to calcine the resultant at from 500 to 1000° C. for from 1 to 5 hours in the air.

<Application>

It is possible to prepare a catalyst composite for exhaust gas purification (referred to as the "present catalyst composite") equipped with a catalyst layer composed of the present catalyst and a substrate, for example, composed of a ceramic or a metallic material.

At this time, the catalyst layer may be one, that is equipped with a constitution in which the catalyst layer is directly formed on the surface of the substrate, or that is equipped with a constitution in which the catalyst layer is formed on the surface of the substrate via another layer, or that is equipped with a constitution in which the catalyst layer is formed at a place that is not on the surface side of the substrate.

(Substrate)

Examples of the material for the substrate of the present catalyst composite may include a refractory material such as a ceramic and a metallic material.

Examples of the material for a ceramic substrate may include a refractory ceramic material such as cordierite, cordierite-alpha alumina, silicon nitride, zircon mullite, spodumene, alumina-silica magnesia, zircon silicate, sillimanite, magnesium silicate, zircon, petalite, alpha alumina, and aluminosilicates.

Examples of the material for a metallic substrate may include a refractory metal such as stainless steel or another suitable corrosion resistant alloy containing iron as the base substance.

The shape of the substrate is not particularly limited. In general, the shape is honeycomb, a plate, or a pellet, and the substrate preferably has a honeycomb shape. In addition, examples of the material for such a catalyst support may include a ceramic such as alumina ($Al_2O_3$), mullite ($3Al_2O_3 \cdot 2SiO_2$), cordierite ($2MgO \cdot 2Al_2O_3 \cdot 5SiO_2$) or a metallic material such as stainless steel.

In the case of using a substrate having a honeycomb shape, for example, it is possible to use a monolithic substrate having a great number of fine gas flow passages parallel to the inside of the substrate, namely, channels so that the fluid flows through the inside of the substrate. At this time, it is possible to form a catalyst layer by coating the present catalyst on the inner wall surface of each channel of the monolithic substrate by wash coating or the like.

(Production of Present Catalyst Composite)

An example of the method for producing the present catalyst composite is described below. A method in which the present catalyst support, a catalytically active component, and if necessary, an OSC material, a stabilizing material, a binder, water, and the like are mixed together and stirred to prepare a slurry, the slurry thus obtained is wash-coated on a substrate such as a ceramic honeycomb shaped substrate, and this is calcined to form a catalyst layer on the substrate surface. However, the producing method is not limited to this method.

At this time, it is preferable that the viscosity of slurry is adjusted in the range from 5,000 to 40,000 cp, it is preferably from 5,000 to 35,000 cp among them, it is preferably from 5000 to 30000 cp among them, from the viewpoint of forming a non-circular large void.

In addition, as the method for drying the slurry after being coated, it is preferable to quickly dry the slurry while removing moisture by applying hot air at about from 100 to 200° C. directly to the coated surface so that the hot air passes through the inside of the void.

However, it is possible to adopt any known method as the method for producing the present catalyst composite, and the method is not limited to the above examples.

DESCRIPTION OF TERMS

In the present specification, In a case in which it is expressed as "X to Y" (X and Y are an arbitrary number, respectively), it also encompasses the meaning "preferably greater than X" or "preferably less than Y" as well as the meaning "X or more and Y or less", unless otherwise stated.

In addition, in a case in which it is expressed as "X or more" (X is an arbitrary number) or "Y or less" (Y is an arbitrary number), it also encompasses the meaning of intending "preferably greater than X" or "preferably less than Y".

EXAMPLES

Hereinafter, the invention will be described in more detail with reference to Examples and Comparative Examples.

<Measurement of Pore Peak>

The pore peak was measured according to the following procedure under the following conditions using an automatic porosimeter "AutoPore IV9520" manufactured by Shimadzu Corporation as the measuring apparatus.

(Measuring Condition)

Measuring environment: room temperature

Measuring cell: sample chamber volume 3 cm$^3$, intrusion volume 0.39 cm$^3$

Measuring range: from 0.0048 MPa to 255.106 MPa

Measuring point: 131 points (points were cut fine so as to have a regular interval at the time taking the logarithm of the pore diameter)

Intrusion volume: it was adjusted so as to be 25% or more and 80% or less.

(Low Pressure Parameter)

Exhaust pressure: 50 μm Hg

Exhaust time: 5.0 min

Mercury intrusion pressure: 0.0034 MPa

Equilibrium time: 10 secs (High Pressure Parameter)

Equilibrium time: 10 secs (Mercury Parameter)

Advancing contact angle: 130.0 degrees

Receding contact angle: 130.0 degrees

Surface tension: 485.0 mN/m (485.0 dynes/cm)

Mercury density: 13.5335 g/mL (Measuring Procedure)

(1) The sample for measurement was weighed by approximately 0.15 g and subjected to the measurement.

(2) In the low pressure section, it was measured at 46 points in a range of from 0.0048 MPa to 0.2068 MPa.

(3) In the high pressure section, It was measured at 85 points in a range of from 0.2241 MPa to 255.1060 MPa.

(4) The pore diameter distribution was calculated from the mercury injection pressure and the mercury intrusion volume.

(5) Thereafter, the void volume diameter of the peak (referred to as the "pore peak") exhibiting the highest intensity was determined.

Incidentally, (2), (3), and (4) above were automatically carried out by the software attached to the apparatus.

<Catalytic Activity Evaluating Method>

In order to evaluate whether the catalytic performance of the precious metal is decreased or not by the sulfur (S) component contained in the exhaust gas in the case of supporting a precious metal, particularly Pd, the catalytic activity was evaluated after subjecting the catalyst to the aging treatment in an environment containing sulfur(S).

(Aging of Catalyst)

Before evaluation using a simulated gas, each catalyst was subjected to the aging treatment in the atmosphere containing 10% $O_2$ and 10% $H_2O$ and 100 ppm $SO_2$, at 250° C. for 20 hours as a simulative sulfur (S) poisoning.

(Evaluation of Exhaust Gas Purifying Performance by Simulated Gas)

The performance of the respective samples obtained in Comparative Examples 1 to 5 and Examples 1 to 13 to purify the simulated exhaust gas was evaluated using a fixed bed flow type reaction apparatus.

In other words, 0.05 g of the catalyst powder (sample) prepared in each of Examples and Comparative Examples was set in the reaction tube, and a mixed gas that consisted of 0.34% CO, 10% CO2, 400 ppm $C_3H_6$, 0.11% $H_2$, 0.38% $O_2$, 500 ppm NO, 10% $H_2O$ and balance $N_2$, as simulative exhaust gas, was introduced into the catalyst powder at a total flow rate of 1000 cc/min. The temperature thereof was raised from room temperature to 700° C. at the rate of 10° C. per minute, the gas concentration at the outlet of the reaction tube was measured, and the temperature (T50) at which 50% of the inlet gas concentration of each component was purified was determined.

For gas analysis, a CO/NOx analyzer ("PG240" manufactured by HORIBA, Ltd.) and a HC analyzer ("VMF-1000F" manufactured by Shimadzu Corporation) were used.

It can be said that the catalyst exhibits superior low temperature activity as the temperature of T50 is lower.

Comparative Example 1

11.5 g of a commercially available boehmite (AlOOH) powder having a pore peak at 35 nm in the measurement using a mercury porosimeter was calcined at 1000° C. for 5 hours. This alumina was stirred in an aqueous solution prepared by adding 50 g of ion exchanged water to a nitrate Pd solution containing Pd at 0.5 part by mass in terms of metal with respect to 99.5 parts by mass of this alumina for 1 hour, and the mixture was dried at 120° C. for 20 hours. This was calcined at 500° C. for 1 hour in the air, thereby obtaining a 5% Pd/alumina powder.

The 5% Pd/alumina powder prepared in this manner was analyzed by the X-ray diffraction (XRD) method, and it was confirmed that the powder had a crystal structure of $\alpha$-$Al_2O_3$ from the results.

Comparative Example 2

1.5 L of 2-propanol, 200 g of aluminum isopropoxide, and 40.9 g of boron n-propoxide were introduced into a three-necked flask that was put in a hot water bath at 50° C., and purged with $N_2$ gas while stirring them to completely dissolve aluminum isopropoxide. Thereafter, 24.6 g of a mixed solution of 2-propanol:water=1:1 was slowly added thereto dropwise to gradually conduct the hydrolysis, thereby obtaining a white gel-like precipitate. This precipitate was washed with ethanol, subsequently washed with ion-exchanged water, and then filtered. Thereafter, the resultant was dried at 120° C. for 20 hours, calcined at 300° C. for 3 hours in the air, and further calcined at 1000° C. for 5 hours in the air, thereby obtaining aluminum borate.

A mixed solution prepared by adding a palladium nitrate solution (0.5 part by mass in terms of metal) to 50 g of ion exchanged water and 99.5 parts by mass of this aluminum borate were stirred for 1 hour. This was dried at 120° C. for 20 hours and then calcined at 500° C. for 1 hour in the air, thereby obtaining a 0.5% by mass Pd-supporting aluminum borate powder.

It was confirmed that the 0.5% by mass Pd-supporting aluminum borate powder prepared in this manner had a crystal structure represented by $10Al_2O_3 \cdot 2B_2O_3$ through the analysis by XRD. The mass ratio of Al/B calculated through the analysis by ICP was 12.5.

Comparative Example 3

In 160 g of ion exchanged water, 2.8 g of boric acid of a special grade chemical was dissolved, 11.5 g of a commercially available boehmite powder having a pore peak at 10 nm in the measurement using a mercury porosimeter was introduced into this, and the mixture was stirred for 1 hour. Thereafter, the mixture thus obtained was dried at 120° C. for 20 hours and calcined at 1000° C. for 5 hours in the air, thereby obtaining aluminum borate. A mixed solution prepared by adding a palladium nitrate solution (0.5 part by mass in terms of metal) to 50 g of ion exchanged water and 99.5 parts by mass of this aluminum borate were stirred for 1 hour. This was dried at 120° C. for 20 hours and then calcined at 500° C. for 1 hour in the air, thereby obtaining a 0.5% by mass Pd-supporting aluminum borate powder.

It was confirmed that the 0.5% by mass Pd-supporting aluminum borate powder prepared in this manner had a crystal structure represented by $10Al_2O_3 \cdot 2B_2O_3$ through the analysis by XRD, and the mass ratio of Al/B calculated through the analysis by ICP was 12.5.

Comparative Example 4

In 160 g of ion-exchanged water, 2.8 g of boric acid of a special grade chemical was dissolved, 9 g of a commercially available γ-alumina powder having a pore peak at 9 nm in the measurement using a mercury porosimeter was introduced into this, and the mixture was stirred for 1 hour. Thereafter, the mixture thus obtained was dried at 120° C. for 20 hours and calcined at 1000° C. for 5 hours in the air, thereby obtaining aluminum borate.

Next, 99 parts by mass of aluminum borate obtained above was added to 50 g of an aqueous solution of lanthanum nitrate containing La at 1 part by mass in terms of metal, and the mixture was stirred for 1 hour. This was dried at 120° C. for 20 hours and then calcined at 600° C. for 3 hours. In this manner, aluminum borate modified with La at 1% by mass in terms of metal was obtained.

A mixed solution prepared by adding a palladium nitrate solution (0.5 part by mass in terms of metal) to 50 g of ion exchanged water and 99.5 parts by mass of this La-modified aluminum borate were stirred for 1 hour. This was dried at 120° C. for 20 hours and then calcined at 500° C. for 1 hour in the air, thereby obtaining a 0.5% by mass Pd-supporting aluminum borate powder.

It was confirmed that the 0.5% by mass Pd-supporting aluminum borate powder prepared in this manner had a crystal structure represented by $10Al_2O_3 \cdot 2B_2O_3$ through the analysis by XRD, and the mass ratio of Al/B calculated through the analysis by ICP was 12.5.

Comparative Example 5

The conditions were the same except that γ-alumina in Comparative Example 4 was changed to a commercially available boehmite having a pore peak at 10 nm in the measurement using a mercury porosimeter.

It was confirmed that the 0.5% by mass Pd-supporting aluminum borate powder prepared in this manner had a crystal structure represented by $10Al_2O_3 \cdot 2B_2O_3$ through the analysis by XRD, and the mass ratio of Al/B calculated through the analysis by ICP was 12.5.

Example 1

In 160 g of ion-exchanged water, 2.8 g of boric acid of a special grade chemical was dissolved, 11.5 g of a commercially available boehmite powder having a pore peak at 18 nm in the measurement using a mercury porosimeter was introduced into this, and the mixture was stirred for 1 hour. Thereafter, the mixture thus obtained was dried at 120° C. for 20 hours and calcined at 1000° C. for 5 hours in the air, thereby obtaining aluminum borate. A mixed solution prepared by adding a palladium nitrate solution (0.5 part by mass in terms of metal) to 50 g of ion exchanged water and 99.5 parts by mass of this aluminum borate were stirred for 1 hour. This was dried at 120° C. for 20 hours and then calcined at 500° C. for 1 hour in the air, thereby obtaining a 0.5% by mass Pd-supporting aluminum borate powder.

It was confirmed that the 0.5% by mass Pd-supporting aluminum borate powder prepared in this manner had a crystal structure represented by $10Al_2O_3 \cdot 2B_2O_3$ through the analysis by XRD, and the mass ratio of Al/B calculated through the analysis by ICP was 12.5.

Example 2

A 0.5% by mass Pd-supporting aluminum borate powder was obtained under the same conditions as in Example 1 except that the commercially available boehmite powder having a pore peak at 18 nm in Example 1 was changed to a commercially available boehmite powder having a pore peak at 35 nm.

It was confirmed that the 0.5% by mass Pd-supporting aluminum borate powder prepared in this manner had a crystal structure represented by $10Al_2O_3 \cdot 2B_2O_3$ through the analysis by XRD, and the mass ratio of Al/B calculated through the analysis by ICP was 12.5.

Example 3

Aluminum borate particles were obtained under the same conditions as in Example 2.

Next, 99 parts by mass of the aluminum borate particles obtained above was added to 50 g of an aqueous solution of lanthanum nitrate containing La at 1 part by mass in terms of metal, and the mixture was stirred for 1 hour. This was dried at 120° C. for 20 hours and then calcined at 600° C. for 3 hours. In this manner, a La-containing aluminum borate powder that was modified with La at 1% by mass in terms of metal was obtained. At this time, the content of La was 1.01 parts by mass in terms of metal with respect to 100 parts by mass of aluminum borate.

A mixed solution prepared by adding a palladium nitrate solution (0.5 part by mass in terms of metal) to 50 g of ion exchanged water and 99.5 parts by mass of this La-containing aluminum borate powder were stirred for 1 hour. This was dried at 120° C. for 20 hours and then calcined at 500° C. for 1 hour in the air, thereby obtaining a 0.5% by mass Pd-supporting and La-containing aluminum borate powder.

It was confirmed that the 0.5% by mass Pd-supporting aluminum borate powder prepared in this manner had a crystal structure represented by $10Al_2O_3 \cdot 2B_2O_3$ through the analysis by XRD, and the mass ratio of Al/B calculated through the analysis by ICP was 12.5.

Example 4

A 0.5% by mass Pd-supporting and La-containing aluminum borate powder was obtained under the same conditions as in Example 3 except that the amount of boric acid was changed from 2.8 g to 5.83 g in Example 3.

It was confirmed that the 0.5% by mass Pd-supporting aluminum borate powder prepared in this manner had a crystal structure represented by $10Al_2O_3.2B_2O_3$ and a crystal structure represented by $2Al_2O_3.B_2O_3$ through the analysis by XRD, and the mass ratio of Al/B calculated through the analysis by ICP was 6.1.

Example 5

A 0.5% by mass Pd-supporting and La-containing aluminum borate powder was obtained under the same conditions as in Example 3 except that the amount of boric acid was changed from 2.8 g to 3.93 g in Example 3.

It was confirmed that the 0.5% by mass Pd-supporting aluminum borate powder prepared in this manner had a crystal structure represented by $10Al_2O_3.2B_2O_3$ through the analysis by XRD, and the mass ratio of Al/B calculated through the analysis by ICP was 8.9.

Example 6

A 0.5% by mass Pd-supporting and La-containing aluminum borate powder was obtained under the same conditions as in Example 3 except that the amount of boric acid was changed from 2.8 g to 2.30 g in Example 3.

It was confirmed that the 0.5% by mass Pd-supporting aluminum borate powder prepared in this manner had a crystal structure represented by $10Al_2O_3.2B_2O_3$ through the analysis by XRD, and the mass ratio of Al/B calculated through the analysis by ICP was 15.2.

Example 7

A 0.5% by mass Pd-supporting and La-containing aluminum borate powder was obtained under the same conditions as in Example 3 except that the amount of boric acid was changed from 2.8 g to 1.01 g in Example 3.

It was confirmed that the 0.5% by mass Pd-supporting aluminum borate powder prepared in this manner had a crystal structure represented by $10Al_2O_3.2B_2O_3$ and a crystal structure represented by $\alpha$-$Al_2O_3$ through the analysis by XRD, and the mass ratio of Al/B calculated through the analysis by ICP was 34.8.

Example 8

A 0.5% by mass Pd-supporting and La-containing aluminum borate powder was obtained under the same conditions as in Example 3 except that the commercially available boehmite powder having a pore peak at 35 nm was changed to a commercially available boehmite powder having a pore peak at 68 nm in Example 3.

It was confirmed that the 0.5% by mass Pd-supporting aluminum borate powder prepared in this manner had a crystal structure represented by $10Al_2O_3.2B_2O_3$ through the analysis by XRD, and the mass ratio of Al/B calculated through the analysis by ICP was 12.5.

Example 9

A 0.5% by mass Pd-supporting and La-containing aluminum borate powder was obtained under the same conditions as in Example 3 except that the commercially available boehmite powder having a pore peak at 35 nm was changed to a commercially available θ-alumina powder having a pore peak at 28 nm and the amount of boric acid was changed from 2.8 g to 4.43 g in Example 3.

It was confirmed that the 0.5% by mass Pd-supporting aluminum borate powder prepared in this manner had a crystal structure represented by $10Al_2O_3.2B_2O_3$ and a crystal structure represented by $2Al_2O_3.B_2O_3$ through the analysis by XRD, and the mass ratio of Al/B calculated through the analysis by ICP was 7.9.

Example 10

A 0.5% by mass Pd-supporting and La-containing aluminum borate powder was obtained under the same conditions as in Example 3 except that the amount of La added was changed from 1% by mass to 0.1% by mass in Example 3. At this time, the content of La was 0.10 part by mass in terms of metal with respect to 100 parts by mass of the aluminum borate particles.

It was confirmed that the 0.5% by mass Pd-supporting aluminum borate powder prepared in this manner had a crystal structure represented by $10Al_2O_3.2B_2O_3$ through the analysis by XRD, and the mass ratio of Al/B calculated through the analysis by ICP was 12.5.

Example 11

A 0.5% by mass Pd-supporting and La-containing aluminum borate powder was obtained under the same conditions as in Example 3 except that the amount of La added was changed from 1% by mass to 5% by mass in Example 3. At this time, the content of La was 5.26 parts by mass in terms of metal with respect to 100 parts by mass of the aluminum borate particles.

It was confirmed that the 0.5% by mass Pd-supporting aluminum borate powder prepared in this manner had a crystal structure represented by $10Al_2O_3.2B_2O_3$ through the analysis by XRD, and the mass ratio of Al/B calculated through the analysis by ICP was 12.5.

Example 12

A 0.5% by mass Pd-supporting and La-containing aluminum borate powder was obtained under the same conditions as in Example 3 except that the amount of ion exchanged water was changed from 160 g to 240 g and the amount of boric acid of a special grade chemical used was changed from 2.8 g to 8.4 g in Example 3.

It was confirmed that the 0.5% by mass Pd-supporting aluminum borate powder prepared in this manner had a crystal structure represented by $2Al_2O_3.B_2O_3$ and a crystal structure represented by $B_2O_3$ through the analysis by XRD, and the mass ratio of Al/B calculated through the analysis by ICP was 4.0.

Example 13

A 0.5% by mass Pd-supporting and La-containing aluminum borate powder was obtained under the same conditions as in Example 3 except that the amount of boric acid of a special grade chemical used was changed from 2.8 g to 0.92 g in Example 3.

It was confirmed that the 0.5% by mass Pd-supporting aluminum borate powder prepared in this manner had a crystal structure represented by $10Al_2O_3.2B_2O_3$ and a crystal structure represented by $\alpha$-$Al_2O_3$ through the analysis by XRD, and the mass ratio of Al/B calculated through the analysis by ICP was 38.0.

TABLE 1

| Catalyst | | Starting material Alumina source | Pore peak (nm) | Void occupation rate Proportion of pores of from 20 to 70 nm to pores of from 10 to 1000 nm (%) | Mass ratio of Al/B Analysis by ICP | Pore peak (nm) | Crystal structure (Analysis by XRD) | 50% active temperature (T50) | | |
|---|---|---|---|---|---|---|---|---|---|---|
| | | | | | | | | CO | HC | NO |
| Comparative Example 1 | Pd (0.5%)/Alumina | Boehmite | 35 | 35 | (Al: 100%) | 35 | α-Al2O3 | 352 | 366 | 430 |
| Comparative Example 2 | Pd (0.5%)/Aluminum borate | Alkoxide | — | 25 | 12.5 | 12 | 10Al2O3•2B2O3 | 352 | 353 | 426 |
| Comparative Example 3 | Pd (0.5%)/Aluminum borate | Boehmite | 10 | 32 | 12.5 | 12 | 10Al2O3•2B2O3 | 340 | 349 | 413 |
| Comparative Example 4 | Pd (0.5%)/La (1%)/Aluminum borate | γ-alumina | 9 | 41 | 12.5 | 12 | 10Al2O3•2B2O3 | 339 | 347 | 411 |
| Comparative Example 5 | Pd (0.5%)/La (1%)/Aluminum borate | Boehmite | 10 | 32 | 12.5 | 12 | 10Al2O3•2B2O3 | 338 | 346 | 409 |
| Example 1 | Pd (0.5%)/Aluminum borate | Boehmite | 18 | 70 | 12.5 | 20 | 10Al2O3•2B2O3 | 331 | 339 | 398 |
| Example 2 | Pd (0.5%)/Aluminum borate | Boehmite | 35 | 94 | 12.5 | 35 | 10Al2O3•2B2O3 | 330 | 336 | 393 |
| Example 3 | Pd (0.5%)/La (1%)/Aluminum borate | Boehmite | 35 | 94 | 12.5 | 35 | 10Al2O3•2B2O3 | 327 | 334 | 367 |
| Example 4 | Pd (0.5%)/La (1%)/Aluminum borate | Boehmite | 35 | 94 | 6.1 | 35 | 10Al2O3•2B2O3 + 2Al2O3•B2O3 | 334 | 336 | 371 |
| Example 5 | Pd (0.5%)/La (1%)/Aluminum borate | Boehmite | 35 | 94 | 8.9 | 35 | 10Al2O3•2B2O3 | 330 | 332 | 367 |
| Example 6 | Pd (0.5%)/La (1%)/Aluminum borate | Boehmite | 35 | 94 | 15.2 | 35 | 10Al2O3•2B2O3 | 332 | 335 | 365 |
| Example 7 | Pd (0.5%)/La (1%)/Aluminum borate | Boehmite | 35 | 94 | 34.8 | 35 | 10Al2O3•2B2O3 + αAl2O3 | 324 | 336 | 365 |
| Example 8 | Pd (0.5%)/La (1%)/Aluminum borate | Boehmite | 68 | 89 | 12.5 | 70 | 10Al2O3•2B2O3 | 320 | 327 | 354 |
| Example 9 | Pd (0.5%)/La (1%)/Aluminum borate | θ-alumina | 28 | 82 | 7.9 | 30 | 10Al2O3•2B2O4 + 2Al2O3•B2O3 | 333 | 336 | 370 |
| Example 10 | Pd (0.5)/La (0.1%)/Aluminum borate | Boehmite | 35 | 94 | 12.5 | 35 | 10Al2O3•2B2O3 | 322 | 332 | 360 |
| Example 11 | Pd (0.5%)/La (5%)/Aluminum borate | Boehmite | 35 | 94 | 12.5 | 35 | 10Al2O3•2B2O3 | 318 | 326 | 353 |
| Example 12 | Pd (0.5%)/La (1%)/Aluminum borate | Boehmite | 35 | 94 | 4.0 | 35 | 2Al2O3•B2O3 + B2O3 | 343 | 363 | 428 |
| Example 13 | Pd (0.5%)/La (1%)/Aluminum borate | Boehmite | 35 | 94 | 33.0 | 35 | 10Al2O3•2B2O3 + αAl2O3 | 359 | 365 | 429 |

DISCUSSION

From the results of Examples above and the tests which the inventors have conducted so far, it has been found that a carrier for an exhaust gas purification catalyst which contains aluminum borate particles having a pore peak of a void volume diameter in the range from 20 nm to 100 nm exhibits excellent sulfur tolerance and can effectively suppress a decrease in catalytic performance of a precious metal due to the poisoning by the sulfur(S) component contained in the exhaust gas, even if the catalyst support supports Pd as a catalytically active component.

The invention claimed is:

1. A carrier for an exhaust gas purification catalyst, comprising aluminum borate particles having a peak exhibiting the highest intensity in a void volume diameter range of from 20 nm to 100 nm in a logarithmic differential void volume distribution measured using a mercury intrusion porosimeter, wherein a mass ratio of a content of aluminum to a content of boron in the aluminum borate particles is from 8.9 to 35.

2. The carrier for an exhaust gas purification catalyst according to claim 1, wherein a void having a void volume diameter of from 20 nm to 70 nm accounts for 50% or more of voids having a void volume diameter of from 10 nm to 1000 nm.

3. The carrier for an exhaust gas purification catalyst according to claim 1, wherein the aluminum borate particles comprise lanthanum (La).

4. The carrier for an exhaust gas purification catalyst according to claim 1, wherein the aluminum borate particles have a crystal structure represented by $10Al_2O_3 \cdot 2B_2O_3$ or $9Al_2O_3 \cdot 2B_2O_3$.

5. An exhaust gas purification catalyst comprising the carrier for an exhaust gas purification catalyst according to claim 1, and Pd as a catalytically active component.

6. A carrier for an exhaust gas purification catalyst, comprising aluminum borate particles having a peak exhibiting the highest intensity in a void volume diameter range of from 20 nm to 100 nm in a logarithmic differential void volume distribution measured using a mercury intrusion porosimeter, wherein the aluminum borate particles have a crystal structure represented by $10Al_2O_3 \cdot 2B_2O_3$ or $9Al_2O_3 \cdot 2B_2O_3$ and a crystal structure represented by $2Al_2O_3 \cdot B_2O_3$.

7. An exhaust gas purification catalyst comprising the carrier for an exhaust gas purification catalyst according to claim 6, and Pd as a catalytically active component.

8. A carrier for an exhaust gas purification catalyst, comprising aluminum borate particles having a peak exhibiting the highest intensity in a void volume diameter range of from 20 nm to 100 nm in a logarithmic differential void volume distribution measured using a mercury intrusion porosimeter, wherein the aluminum borate particles have a crystal structure represented by $10Al_2O_3 \cdot 2B_2O_3$ or $9Al_2O_3 \cdot 2B_2O_3$ and a crystal structure represented by $Al_2O_3$.

9. An exhaust gas purification catalyst comprising the carrier for an exhaust gas purification catalyst according to claim 8, and Pd as a catalytically active component.

* * * * *